June 15, 1965  G. P. McGRAW, JR  3,188,716
METHODS OF MAKING CAPACITORS
Filed Nov. 10, 1961  5 Sheets—Sheet 5
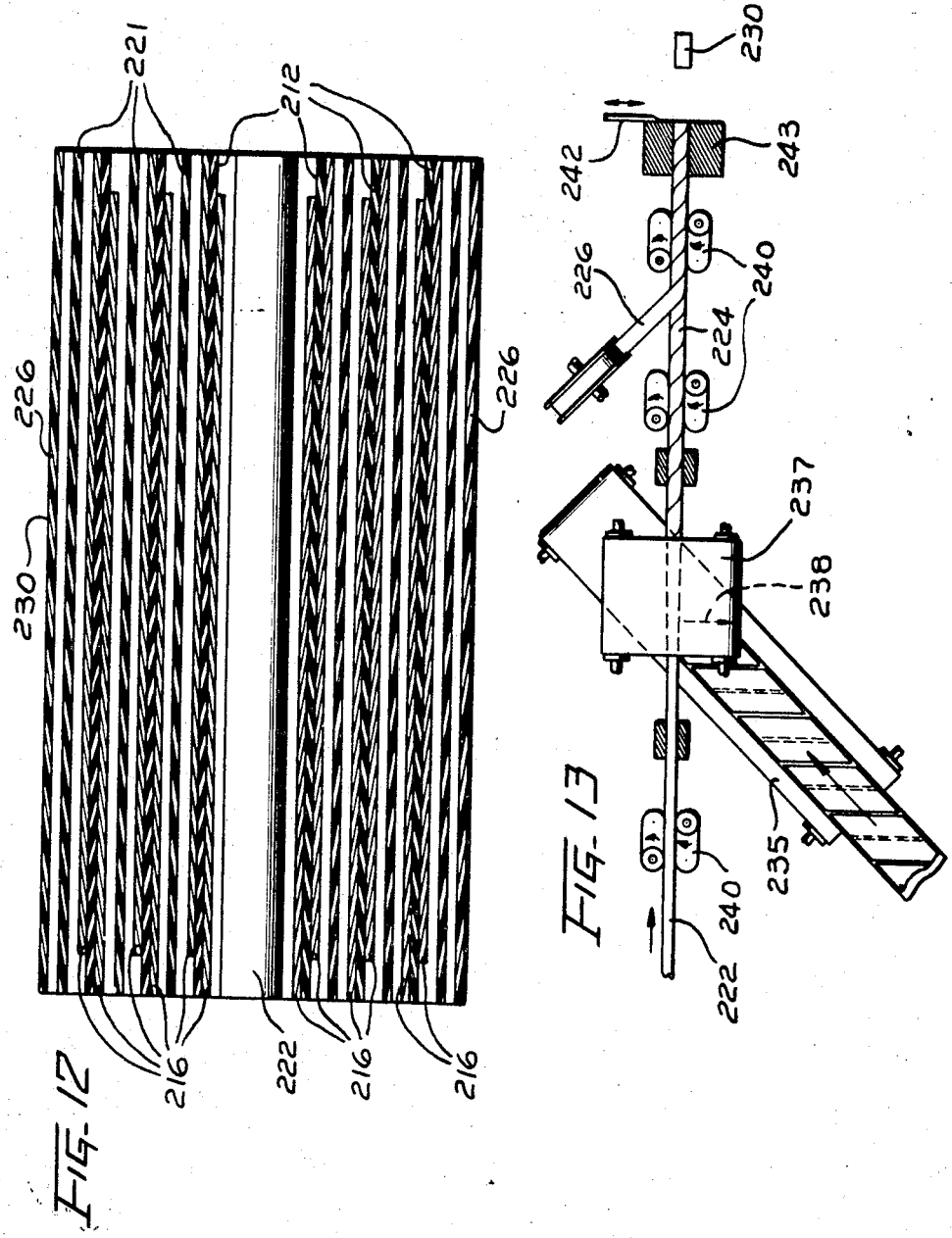
INVENTOR
G. P. McGRAW, Jr.
BY A.C. Schwarz Jr.
ATTORNEY

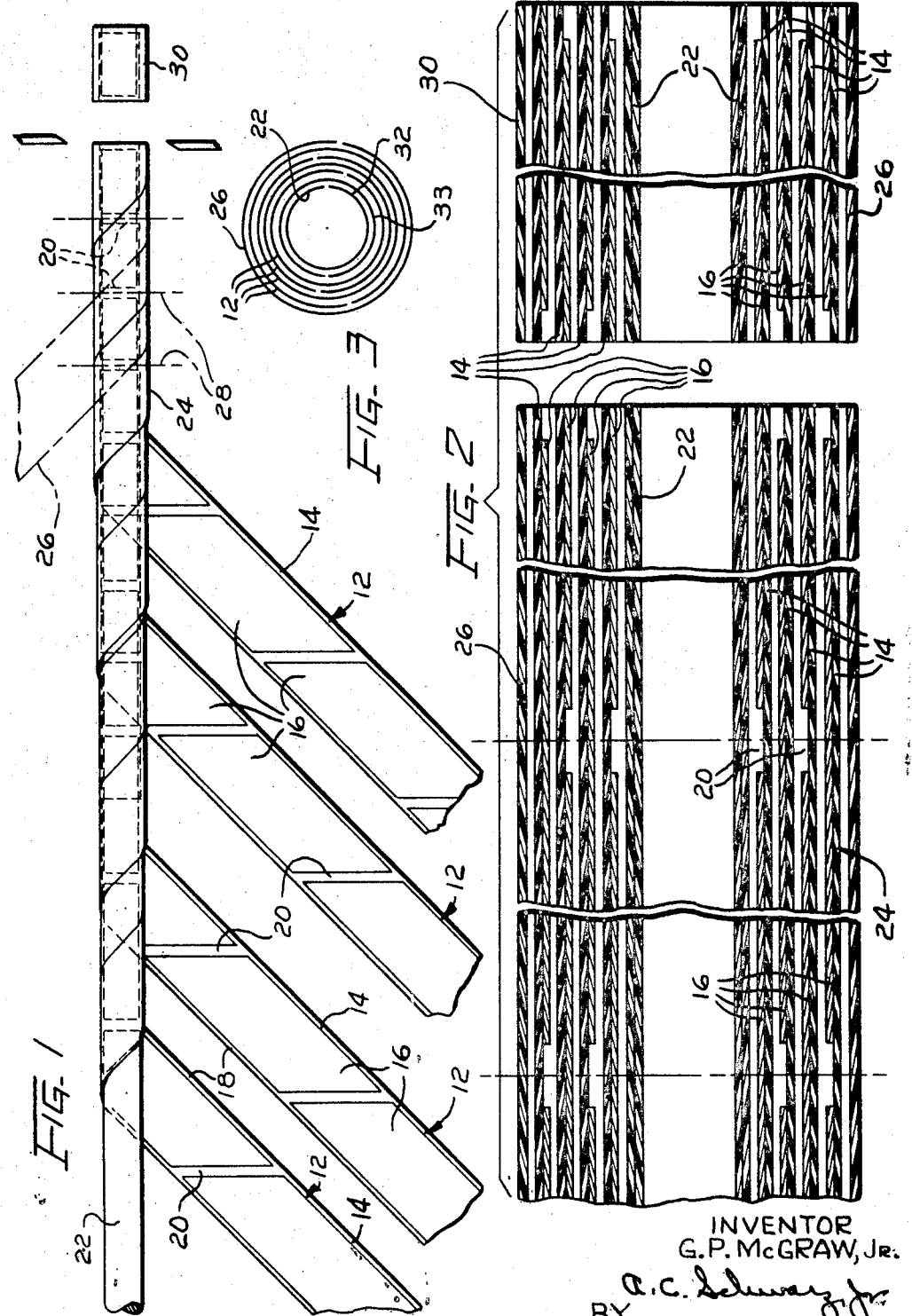

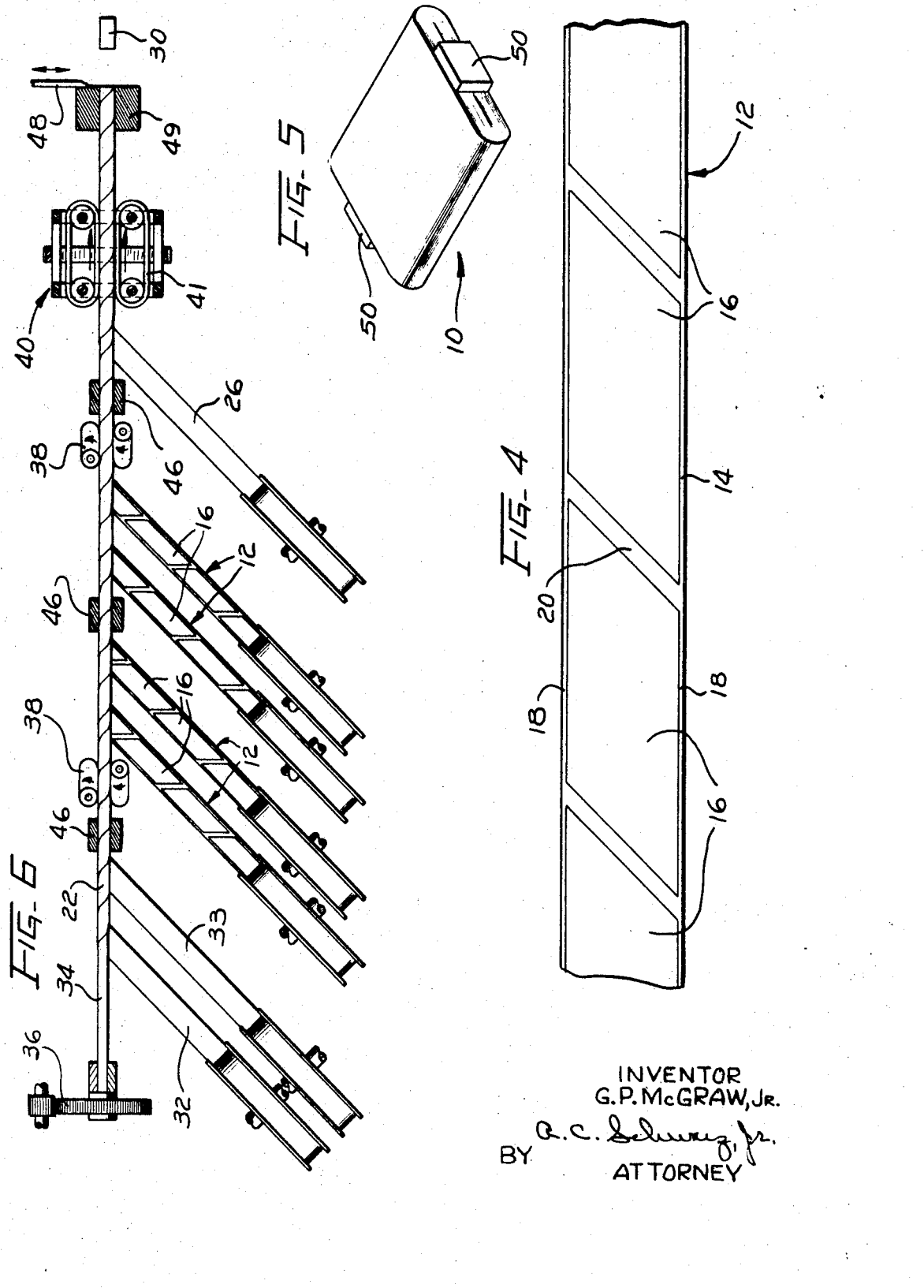

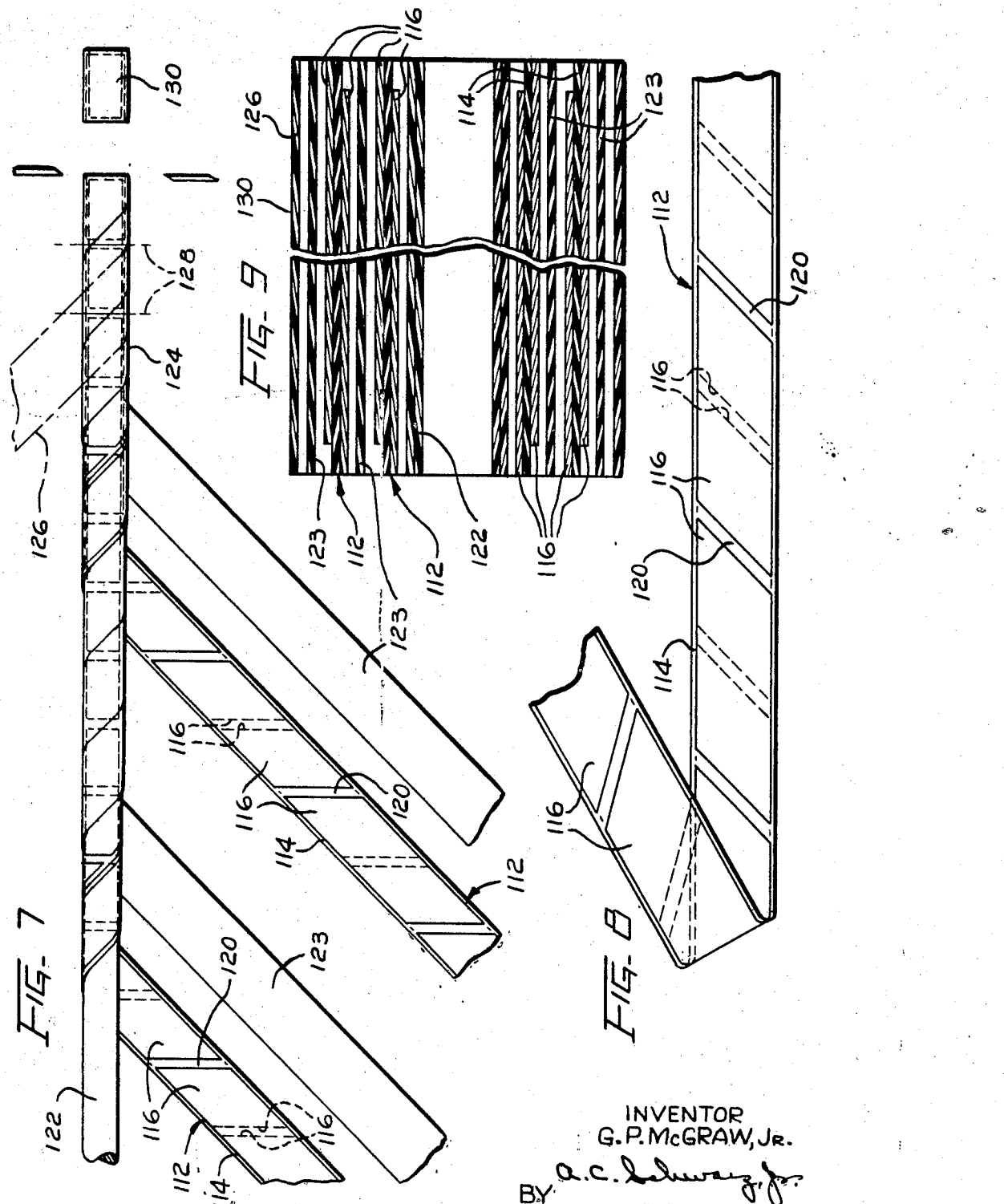

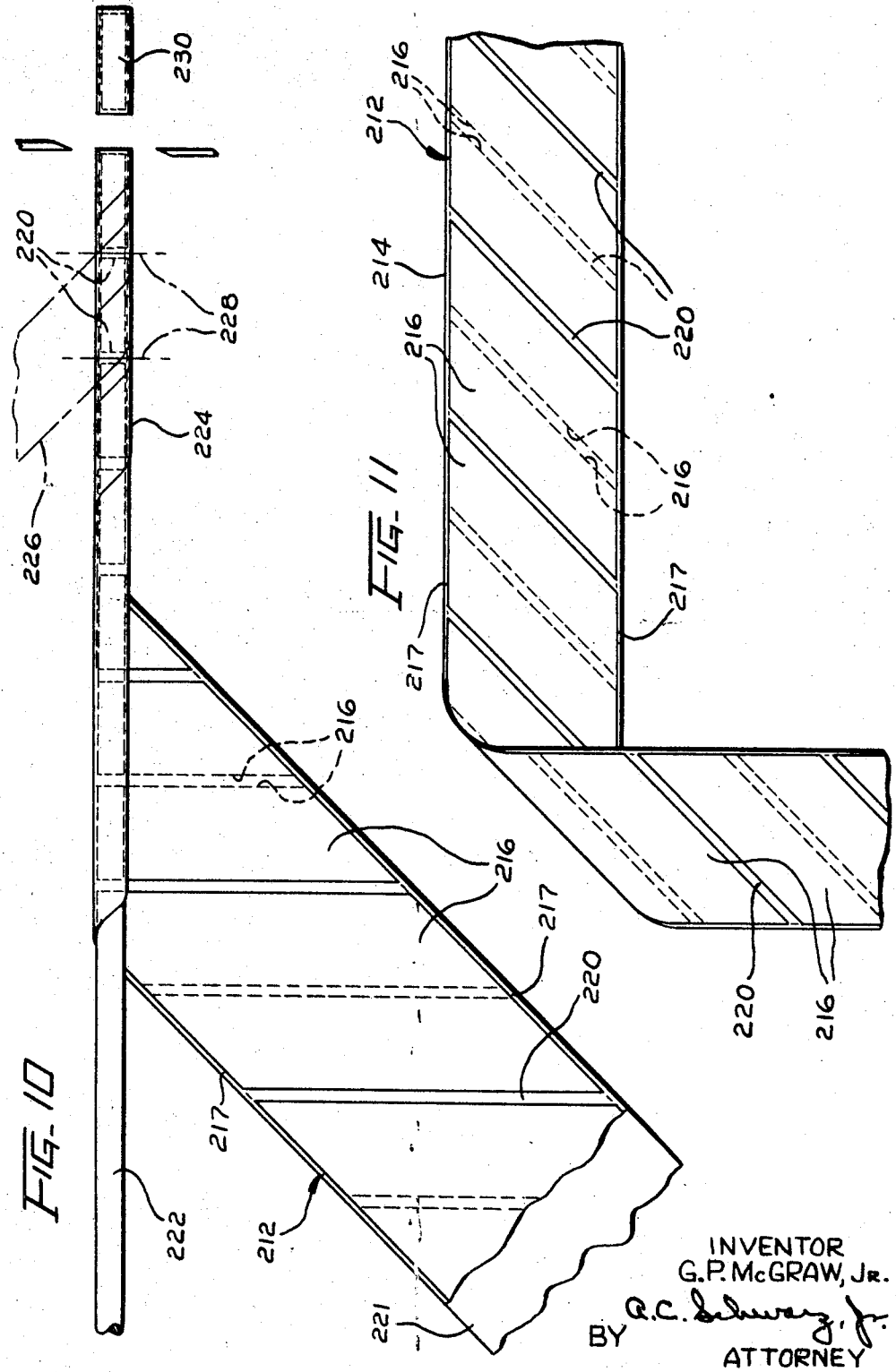

United States Patent Office 3,188,716
Patented June 15, 1965

3,188,716
METHODS OF MAKING CAPACITORS
George P. McGraw, Jr., Downers Grove, Ill., assignor to Western Electric Company, Incorporated, a corporation of New York
Filed Nov. 10, 1961, Ser. No. 151,574
12 Claims. (Cl. 29—25.42)

This invention relates to methods of making capacitors, and more particularly to methods of progressively forming an elongated member of interconnected capacitors and shearing successive capacitors therefrom.

An object of the present invention is to provide improved methods of making capacitors.

Other objects of the invention are to provide improved methods of progressively fabricating a continuous length of interconnected capacitors and of shearing successive capacitors therefrom.

A method embodying certain aspects of the invention may include the steps of metallizing webs of dielectric material of indefinite length to form a row of uniformly shaped electrodes on one side of each of the webs and with the spaces between the end portions of the electrodes disposed in parallel relation to each other and obliquely to the length of the webs. A plurality of the metallized webs are continuously wound helically onto a core of dielectric material to form a composite tube with the electrodes arranged annularly about the core and in insulated, staggered and overlapping relation to one another along the tube to form a row of interconnected capacitor units. The helically wound webs, the edges of which abut each other, are secured against unwinding by winding an adhesive tape over the abutting edges of the webs, after which the composite tube is sheared transversely thereof through the spaces between the ends of the electrodes and through the electrodes aligned with spaces to sever successive capacitors from the composite tube.

The capacitor thus formed includes a core having a plurality of concentric longitudinally split layers of dielectric web thereon with a plurality of concentric longitudinally split electrodes disposed between the dielectric webs in insulated and overlapping relation to one another and with two sets of alternate electrodes longitudinally offset relative to each other and with the electrodes of one set extending from one end of the capacitor and the other set of electrodes extending to the other end of the capacitor.

In a modified embodiment of the invention, a web of dielectric material is metallized to form a row of spaced electrodes on each side therof with the spaces between the electrodes being parallel to each other and disposed obliquely to the edges of the web and with each of the electrodes on each side of the web being in overlapping relation to a pair of electrodes on the opposite side of the web. A plurality of such metallized webs are continuously wound helically onto a core of dielectric material with second non-metallized webs of dielectric material interposed therebetween to form a composite tube with the electrodes arranged in insulated, staggered and overlapping relation to one another along the tube to form a row of interconnected capacitors. The tube is then sealed against unwrapping of the webs, after which the tube is successively sheared transversely of its axis through successive spaces between the electrodes and through the electrodes aligned with the spaces to sever successive capacitors from the tube.

In a further embodiment of the invention, a relatively wide web of dielectric material is metallized to form a row of electrodes on each side therof, the electrodes in each row and the spaces separating them being disposed obliquely to the edges of the web and each of the electrodes being offset and in overlapping relation to a pair of the electrodes on the opposite side of the web. The metallized web and a non-metallized web of dielectric material are wound helically onto a core of dielectric material to form a composite tube of progressively increasing length with the electrodes wound convolutely about the core and arranged in insulated, staggered and overlapping relation to one another along the tube to form a row of interconnected capacitor units about which an adhesive tape is wound to prevent unwinding of the webs. Thereafter the composite tube is sheared transversely thereof through the spaces between the electrodes and through the electrodes aligned with the spaces to sever successive capacitors therefrom.

The capacitor thus formed includes a metallized dielectric web and a non-metallized dielectric web convolutely wound onto a dielectric core and supporting a pair of convolutely wound electrodes therebetween in insulated and overlapping relation to one another, the electrodes being partially offset longitudinally relative to each other with one electrode extending from one end of the capacitor and the other electrode extending from the other end of the capacitor.

Other objects, advantages and novel aspects of the invention will become apparent upon consideration of the following detailed description, in conjunction with the accompanying drawings, in which:

FIG. 1 is a fragmentary diagrammatic view illustrating one embodiment of the invention for continuously forming capacitors;

FIG. 2 is an enlarged diagrammatic longitudinal cross sectional view of a composite tube of interconnected capacitors and a capacitor severed therefrom in accordance with this method and showing the several layers of the composite tube and the capacitor in separated relation to one another;

FIG. 3 is a diagrammatic end elevation view of the capacitor showing the several concentric layers of the capacitor in separated relation to one another;

FIG. 4 is a fragmentary view of a metallized web of dielectric material with a row of electrodes formed on one side thereof for use in the fabrication of capacitors of one type;

FIG. 5 is a perspective view of the completed capacitor after it has been shaped and terminals applied thereto;

FIG. 6 is a diagrammatic view of an apparatus for practicing one embodiment of the present invention;

FIG. 7 is a fragmentary diagrammatic view illustrating a second embodiment of the invention for continuously fabricating capacitors;

FIG. 8 is a fragmentary view of a metallized web of dielectric material with a row of spaced electrodes on each side thereof used for fabricating capacitors of another type;

FIG. 9 is an enlarged longitudinal cross sectional view through a capacitor formed according to the second embodiment of the invention and showing the several layers of the capacitor in separated relation to one another;

FIG. 10 is a fragmentary diagrammatic view illustrating a third embodiment of the invention for fabricating capacitors;

FIG. 11 is a fragmentary view a metallized web of dielectric material with electrodes of special configuration on opposite sides thereof used in the manufacture of capacitors of a third type;

FIG. 12 is an enlarged diagrammatic fragmentary longitudinal sectional view through a capacitor made in accordance with the third embodiment of the invention and showing the several layers thereof in separated relation to one another; and FIG. 13 is a diagrammatic view of an apparatus for fabricating capacitors in accordance with the third embodiment of the invention.

Referring to the drawings, capacitors 10 (FIG. 5) made according to one embodiment of the present invention, are formed principally from a plurality of metallized webs 12 (FIGS. 1 and 4) of indefinite length each comprising a web 14 of dielectric material on which vaporized metal has been deposited in a metallizing apparatus to form a row of uniformly shaped electrodes 16 of predetermined, uniform area and outline. The dielectric web may be paper or a resinous composition such as polyethylene teraphthalate. The electrodes 16, of parallelogram configuration, extend across the major portion of the width of the web 14 with narrow margins 18 of the web extending beyond the electrodes on opposite edges thereof. The ends of the electrodes 16 and the spaces 20 between the electrodes are disposed obliquely to the edges of the webs 14 and in parallel relation to each other.

A plurality of the metallized webs 12 of indefinite length are continuously wound helically onto a core 22 of dielectric material to form a progressively lengthening composite tube 24 of interconnected capacitors (FIG. 1) with the edges of the metallized webs 12 in abutting engagement with each other and with the metallized webs 12 forming a plurality of concentric layers with the electrodes 16 thereon and the spaces 20 between the electrodes assuming cylindrical configurations, and with the electrodes of alternate layers disposed in aligned and overlapping relation to each other and with the electrodes in adjacent layers being disposed in staggered and telescoping relation to one another. A pressure sensitive tape 26 of dielectric material is wound around the composite capacitor tube 24 in overlapping and adhering engagement with the abutting marginal portions of the outer web 14 to prevent the webs 12 from unwinding, after which the thus formed composite tube is sheared along planes 28 extending perpendicular to the axis of the tube and passing through successive spaces 20 and through the central portion of the electrodes 16 aligned with the spaces to sever successive individual capacitors 30 from the composite tube 24.

The core 22 may be a solid rod of dielectric material, if desired, but preferably the core is of collapsible tubular form. As indicated in FIG. 6, two webs 32 and 33 of dielectric material from suitable supply rolls thereof are wound helically around an arbor 34 with the edges of each web in abutting relation to each other. The second web 33 preferably is of the pressure sensitive type and is wound in overlying and adhering relation to the abutting marginal portion of the first web 32 to form the double wall flexible tubular core 22.

Rotation is imparted to the arbor 34 by a suitable gear drive 36 (FIG. 6) to effect the winding of the webs 32 and 33 thereon to form the core tube 22. Axial and rotary movement is imparted to the core tube 22 and the composite tube 24 by a suitable drive mechanism including a plurality of pairs of obliquely disposed driven rollers 38 and a tractor type capstan 40 engaging the core tube 22 and the composite tube 24 at spaced portions thereof. The capstan 40 which is rotated by suitable gear drive (not shown) includes a pair of endless belts 41 which engage the capacitor tube 24 therebetween and are actuated to impart simultaneous axial and rotary movement to the composite tube 24. A plurality of apertured members 46 are provided for supporting the core tube 22 and the composite tube 24 as they are fabricated and advanced.

The metallized webs 12 are wound in pairs, two pairs of webs being disclosed in the embodiment shown in FIGS. 1–6, to form four layers of metallized webs in the composite capacitor tube 24. It will be understood that the electrodes 16 on the metallized webs 12 are of a predetermined configuration and that the webs 12 are helically wound onto the core 22 at a predetermined angle so that the electrodes 16 in the several layers of the composite capacitor tube 24 and the spaces 20 therebetween assume annular or cylindrical configurations. Thus, each electrode in the composite tube has a cylindrical shape with the longitudinal edges of the electrode forming a helical split or space therebetween and with the end edges of the electrodes 16 disposed parallel to a plane extending perpendicular to the axis of the tube.

From an inspection of FIG. 1, it will be observed that the metallized webs 12 are wound in a predetermined relation to each other to position the electrodes 16 of adjacent layers of metallized webs in the composite tube 24 in staggered or longitudinally offset relation to each other so that the areas of overlap of the end portions of the electrodes is uniform and of a predetermined size.

A movable shearing blade 48 is actuated by suitable mechanism (not shown) in timed relation to the axial movement of the composite tube 24 and cooperates with a stationary apertured shear 49 to effect the shearing of the capacitor tube 24 along the planes 28 to sever successive capacitors 30 from the tube 24. During each shearing action the movable blade 48 shears one pair of alternate layers of metallized web through the spaces 20 between the electrodes and shears the other pair of layers of metallized web and the electrodes 16 thereon midway between the ends of the latter.

The capacitor 30 thus formed comprises a tubular core 22, four concentric layers of metallized web 12 with the electrodes 16 thereon in insulated and overlapping relation to one another and a concentric outer layer of pressure sensitive tape 26. The electrodes 16 are shorter than the length of the capacitor 30 with the electrodes of one set of alternate layers of metallized web extending from one end of the capacitor and stopping short of the other end thereof and the electrodes 16 of the other set of alternate layers of metallized web extending from the other end of the capacitor and stopping short of the one end thereof. Each of the concentric layers of the webs 12, 32, 33 and 26 is cylindrical in form with the longitudinal edges thereof disposed in abutting relation to each other along a helical path. After the capacitors 30 have been severed from the composite tube 24 they are flattened and terminals 50 of molten metal are sprayed onto the ends thereof.

In another embodiment of the invention as disclosed in FIGS. 7 to 9, relatively narrow metallized webs 112 are used, each comprising a web 114 of dielectric material having a row of electrodes 116 of predetermined parallelogram configuration on opposite sides thereof. The ends of the electrodes and the spaces 120 therebetween are disposed in parallel relation to one another and in predetermined oblique relation to the edges of the web and with the electrodes on one side of the web in staggered and in overlapping relation to the electrodes on the other side of the web so that the areas of overlap of the end portions of the electrodes are uniform and of a predetermined size.

A metallized web 112 is wound helically about a core 122 of dielectric material to form a first tubular layer of metallized web with the longitudinal edges of the web in abutting relation to each other. A first relatively narrow non-metallized web 123 of dielectric material is wound helically onto the first layer of metallized web 112 in overlapping relation to the abutting edges thereof to form a protective layer of dielectric for the exposed row of electrodes 116.

A second metallized web 112 is wound helically onto the second layer of web 123 in a predetermined relation to the first metallized web 112 to align the outer and inner electrodes 116 thereon with the outer and inner electrodes 116 of the first metallized web 120 longitudinally of the core 122. A second web 123 of non-metallized dielectric material is wound onto the second metallized web 112 to form a protective layer of dielectric for the outer row of electrodes 116 of the second dielectric web 112. The several layers of metallized dielectric web 112 and non-metallized webs 123 form a progressively lengthening composite tube 124 of interconnected capacitors around which an adhesive tape of dielectric material 126 is wound in adhering engagement therewith to prevent the unwinding of the composite tube 124.

It will be understood that the several webs 112, 112, 123, 123 and 126 are wound simultaneously onto the core 122 and onto one another in the manner similar to that of the first embodiment.

The electrodes 116 in the composite tube 124 are of cylindrical shape with the longitudinal edges thereof disposed along a helical path and with the electrodes 116 disposed relative to one another in the composite tube 124 in substantially the same relation as the electrodes 16 of the composite tube 24 of the first embodiment of the invention. The tube 124 of interconnected capacitors is then sheared along planes 128 disposed perpendicular to the axis of the tube and passing through the spaces 120 between the ends of the electrodes 116 and through the middle of the electrodes aligned with the spaces to sever successive capacitors 130 from the composite tube 124.

In another embodiment of the invention disclosed in FIGS. 10 to 13, a single relatively wide metallized web 212 is used. This metallized web comprises a web 214 of dielectric material and a row of electrodes 216 on opposite sides thereof. The electrodes are of predetermined parallelogram configuration and extend substantially across the full width of the web leaving but a slight margin 217 on opposite sides thereof, and the electrodes 216 and the spaces 220 between them are disposed obliquely to the edge of the web 212. As disclosed in FIGS. 10 to 12, the electrodes on one side of the web are disposed in staggered and partially overlapping relation to the electrodes 216 on the other side of the web with the spaces 220 between the electrodes on one side of the web disposed midway between the spaces on the other side of the web so as to provide overlapping portions of the electrodes of uniform area and of a predetermined size. The metallized web 212 from a supply thereof of indefinite length is superposed on a non-metallized web 221 of dielectric material of indefinite length and wound helically onto a core 222 to form a composite tube 224 of interconnected capacitors.

As the metallized web 212 is wound onto the core 222, the electrodes 216 thereof are wound convolutely into spiral configuration in overlapping relation to themselves with the ends thereof and the spaces 220 therebetween disposed parallel to a plane perpendicular to the axis of the tube 224. The end portions of each of the electrodes longitudinally of the tube 224 are disposed in insulated and overlapping relation to end portions of a pair of the electrodes on the opposite side of the metallized web. To prevent the metallized web 212 from unwinding, an adhesive tape 226 of dielectric material is wound helically around the tube 224. The progressively lengthening tube thus formed is sheared at intervals along planes extending perpendicular to the axis of the tube and passing through successive spaces 220 between the electrodes 216 and through the middle portion of the electrodes aligned with the spaces to sever successive capacitors 230 from the tube.

As shown in FIG. 13, the superposed metallized web 212 and non-metallized web 221 are supported on the upper flight of a belt conveyor 235, the web 221 being adhered thereto by suction means acting through perforations in the conveyor belt. The conveyor belt 235 is actuated by a suitable drive (not shown) to advance the superposed tapes 212 and 221 under and into engagement with the core 222 around which the superposed webs 212 and 221 are wrapped by an upper endless belt 237.

The belt 237 is driven by a suitable drive to cause the lower flight thereof to move in the direction of the dotted arrow 238 in engagement with the web 221 and in cooperation with the conveyor belt 235 to cause the superposed webs 212 and 221 to be wound helically around the core 222 and to effect the rotary and axial movement of the core 222 and the composite tube 224. Rotary and axial movement is imparted to the core 222 by suitable drive rollers 240. Other drive rollers 240 engage and impart rotary and axial movement to the composite tube 224.

A movable shear blade 242 is actuated in timed relation to the axial movement of the composite capacitor unit 224 by suitable mechanism (not shown) and cooperates with a stationary apertured shear member 243 to sever successive capacitors 230 from the composite capacitor tube 224.

A capacitor 230 thus formed includes a core 222 around which the superposed metallized and unmetallized webs 212 and 221 are supported in a helical pattern with the electrodes disposed therebetween in insulated and convolutely wound relation to each other. As disclosed in FIG. 12, the electrodes 216 of the capacitor are of less longitudinal length than the length of the dielectric web 214 of the capacitor and the electrodes are offset slightly relative to each other longitudinally of the capacitor with one electrode extending axially from one end of the capacitor and with the other electrode extending axially from the other end of the capacitor. The longitudinal edges of the electrodes and of the dielectric webs 212 and 221 extend longitudinally of the capacitor along helical paths and a protective layer of adhesive tape 226 encircles the capacitor unit and prevents it from unwinding.

In lieu of wrapping an adhesive tape around the composite tubes of interconnected capacitors in the several embodiments of the invention, a heated tool may be applied to the tube as it advances to effect the progressive sealing or bonding of the marginal portions of the outer dielectric web of the composite tube to prevent the unwinding of the webs of the composite tube and of the capacitors severed therefrom.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of fabricating capacitors which comprises forming a plurality of webs of dielectric material of indefinite length with a row of electrodes on each of at least two of the sides of the several sides of the webs and with the electrodes in each row disposed parallel to one another and obliquely to the edges of the web, simultaneously winding the plurality of webs helically about an axis in predetermined overlapping relation to one another to form a composite member of interconnected capacitors of progressively increasing length with the electrodes disposed in layers in the composite member and between layers of dielectric web in insulated relation to one another and with the ends of the electrodes in planes perpendicular to the axis and with the electrodes in staggered and overlapping relation to one another, and successively shearing the composite member transversely thereof along planes passing through the spaces between the ends of the electrodes and through the intermediate portions of the electrodes aligned with the spaces to form individual capacitors.

2. A method of fabricating capacitors which comprises forming a plurality of webs of dielectric material of indefinite length with a row of electrodes on each of at least two of the sides of the several sides of the webs and with the electrodes in each row disposed parallel to one another and obliquely to the edges of the web, forming a continuous core of dielectric material, simultaneously winding the plurality of webs helically about the core in a predetermined overlapping relation to one another to form a progressively lengthening composite member of interconnected capacitors with the ends of the electrodes disposed in planes perpendicular to the axis of the core and with the electrodes disposed in layers in the composite member in insulated relation to one another between layers of web and with each of the electrodes in staggered and overlapping relation to a pair of electrodes in an adjacent layer, and successively shearing the composite member transversely thereof along planes passing through the spaces between the ends of the electrodes and through the intermediate portions of the electrodes aligned with the spaces to sever successive capacitors.

3. A method of fabricating capacitors which comprises forming a plurality of webs of dielectric material of indefinite length with a row of electrodes on each of at least two of the sides of the several sides of the webs and with the electrodes in each row disposed parallel to one another and obliquely to the edges of the web, forming a continuous core of dielectric material, simultaneously winding the plurality of webs about the dielectric core in a helical path in a predetermined overlapping relation to one another to form a composite member of interconnected capacitors of progressively increasing length with the electrodes disposed in layers in the composite member and between layers of dielectric web in insulated relation to one another and with the ends of the electrodes in planes perpendicular to the axis of the core and with each of the electrodes in staggered and overlapping relation to a pair of electrodes in an adjacent layer, bonding together successive portions of the outer layer of dielectric webs to prevent the unwinding of the webs, and successively shearing the composite member transversely thereof along planes passing through the spaces between the ends of the electrodes and through the intermediate portions of the electrodes aligned with the spaces.

4. In a method of making capacitors the steps of forming a row of longitudinally spaced electrodes on opposite sides of a first web of dielectric material of indefinite length with the electrodes arranged in parallel relation to one another and obliquely to the edges of the web and with the electrodes on one side of the web disposed in staggered and overlapping relation to the electrodes on the opposite side of the web; winding the first web and a second web of dielectric material helically about an axis in overlying relation to one another to form a tube of progressively increasing length of interconnected capacitors with portions of the first web in overlapping relation to itself and with the electrodes wound convolutely about the axis of the tube and spaced longitudinally of the tube in insulated and overlapping relation to one another and with the ends of the electrodes disposed in planes perpendicular to the axis; and successively shearing the tube of interconnected capacitors transversely thereof along planes passing through the spaces between the ends of the electrodes and through intermediate portions of the electrodes aligned with the spaces.

5. A method of fabricating capacitors which comprises metallizing a first web of dielectric material of indefinite length to form a row of longitudinally spaced electrodes on each side thereof with the electrodes arranged in parallel relation to one another and obliquely to the edges of the web and with each of the electrodes disposed in staggered and overlapping relation to a pair of electrodes on the opposite side of the web; winding the first web and a second web of dielectric material helically about a core of dielectric material in overlying relation to one another to form a tube of interconnected capacitors of progressively increasing length with portions of the first web in overlapping relation to itself and with the electrodes wound convolutely about the core and spaced longitudinally thereof in insulated, staggered, and overlapping relation to one another and with the ends of the electrodes disposed in planes perpendicular to the axis of the core; applying a web of dielectric material to successive portions of the tube as it is formed to prevent the webs from unwinding; and successively shearing the tube of capacitors transversely thereof along planes passing through the spaces between the ends of the electrodes and through intermediate portions of the electrodes aligned with the spaces to sever successive capacitors from the tube.

6. A method of fabricating capacitors which comprises metallizing a first web of dielectric material of indefinite length to form on each side thereof a row of longitudinally spaced electrodes of parallelogram outline with the ends of the electrodes and the spaces therebetween arranged in parallel relation to one another and obliquely to the edges of the web and with each of the electrodes disposed in staggered and overlapping relation to a pair of the electrodes on the opposite side of the web; winding said first web and a second web of dielectric material helically about a core of dielectric material in overlying relation to one another to form a progressively lengthening composite member of interconnected capacitors with portions of the first web in helically overlapping relation to itself and with the electrodes wound convolutely about the core and disposed longitudinally thereof in insulated, staggered and overlapping relation to one another and with the ends of the electrodes disposed in planes perpendicular to the axis of the core; applying a pressure sensitive tape of dielectric material to successive portions of the composite member to prevent the unwinding of the webs; and successively shearing the composite member transversely thereof along planes passing through the spaces between the ends of the electrodes and through intermediate portions of the electrodes aligned therewith to sever individual capacitors.

7. A method of making capacitors which comprises forming a row of spaced electrodes on one side of each of a plurality of strips of dielectric material of indefinite length to provide composite webs with the electrodes and the spaces between the electrodes disposed parallel to one another obliquely to the edges of the webs; winding a plurality of the composite webs helically onto a core of dielectric material into overlapping relation to one another to form a composite member of progressively increasing length of interconnected capacitors having a plurality of layers of electrodes supported between the webs in insulated relation to one another and with the electrodes in the adjacent layers in staggered and overlapping relation to one another and with the electrodes in alternate layers of the tube in alignment with one another longitudinally of the composite member and with the ends of the electrodes disposed in planes perpendicular to the axis of the core; progressively applying an outer layer of dielectric material onto the composite member as it is formed to prevent the webs from unwinding; and successively shearing the composite member along planes passing perpendicular to the axis of the member through the spaces between the ends of the electrodes and through intermediate portions of the electrodes aligned with the spaces.

8. A method of continuously making capacitors which comprises metallizing webs of dielectric material of indefinite length to form on one side of each web a row of spaced electrodes of uniform parallelogram configuration and with the electrodes disposed parallel to each other and in oblique relation to the edges of said webs; helically winding a pair of webs of dielectric material about an axis to form a tubular core; helically winding a plurality of the metallized webs onto the core to form a progressively lengthening tube of interconnected capacitors having a plurality of superposed helically split concentric layers of metallized web with the electrodes in each of the layers annularly encircling the core and being disposed in longitudinally spaced relation to one another and in insulated, staggered, and telescoping relation to the electrodes of adjacent layers; progressively applying an adhesive tape onto the tube of interconnected capacitors to hold the webs against unwinding; and successively shearing the tube of capacitors along planes passing transversely of the tube through the spaces between the electrodes and through intermediate portions of the electrodes aligned with the spaces.

9. A method of continuously making capacitors which comprises metallizing webs of dielectric material of indefinite length thereof to form on one side of each web a row of spaced electrodes of uniform parallelogram configuration and with the electrodes disposed parallel to each other and in oblique relation to the edges of said webs; winding a pair of webs of dielectric material helically in overlapping relation to one another to form a tubular core; helically winding onto said core a plurality of the metallized webs with the longitudinal edges of each web in abutting relation to each other to form a progressively lengthening composite tube of interconnected capacitors having a plurality of superposed longitudinally split layers of metallized web with the electrodes in each of the layers encircling the core and being disposed in longitudinally spaced relation to one another and in insulated, staggered, and telescoping relation to the electrodes of adjacent layers and with the ends of the electrodes and the spaces therebetween disposed parallel to a plane perpendicular to the axis of the composite tube; sealing successive marginal portions of the abutting longitudinal edges of the exposed web of the composite tube of interconnected capacitors as it is formed to hold the webs against unwinding; and successively shearing the composite tube transversely thereof along planes passing through the spaces between the electrodes and through portions of the electrodes aligned with the spaces to sever successive capacitors.

10. A method of continuously fabricating capacitors which comprises forming a row of spaced electrodes on each side of each of a plurality of first webs of dielectric material of indefinite length with the electrodes on one side of the webs disposed in staggered and overlapping relation to the electrodes of the other side of the webs and with the electrodes and the spaces between the ends of the electrodes disposed in parallel relation to each other and obliquely to the edges of the webs, winding a plurality of the metallized webs and a plurality of second webs of dielectric material helically about a core of dielectric material to form a tube of interconnected capacitors having a plurality of layers of said metallized webs separated by layers of the second webs and with the electrodes disposed annularly about the core in staggered and overlapping relation to one another longitudinally of the core and with corresponding electrodes of said metallized webs aligned with one another longitudinally of the core, progressively securing an outer layer of dielectric material to the tube of interconnected capacitors to prevent the unwinding of the layers of web, and succesively shearing the tube of capacitors transversely thereof along planes passing through the spaces between the electrodes and through the portions of the electrodes aligned with the spaces.

11. A method of making capacitors which comprises, forming first dielectric webs of a predetermined width and of indefinite length, forming second dielectric webs of a predetermined width and of an indefinite length each having a longitudinal row of metallized electrodes on one face thereof, helically winding a plurality of the first and the second webs in overlapping relation to each other to form a composite tubular member with the electrodes of one of the second webs in axially spaced relation to each other and in insulated, partially overlapping and longitudinally staggered relation to the electrodes of the adjacent second web, and shearing the composite tubular member transversely of the axis thereof at intervals between adjacent electrodes of the second webs.

12. A method of forming capacitors which comprises, forming a plurality of dielectric first webs of a predetermined width and of indefinite length, forming at least one dielectric second web of a predetermined width and of indefinite length having a longitudinal row of metallized eletctrodes on opposite sides thereof and with the electrodes on one side of the web in staggered and partially overlapping relation to the electrodes on the other side of the web, helically winding a plurality of the first and the second dielectric webs in overlapping relation to each other to form a composite tubular member with the electrodes in each row disposed in axially spaced relation to one another and with each electrode in insulated and partially overlapping relation to a pair of the electrodes in the adjacent row, and shearing the composite tubular member at spaced portions thereof between adjacent electrodes to form individual capacitor units.

References Cited by the Examiner
UNITED STATES PATENTS

| | | | |
|---|---|---|---|
| 1,841,628 | 1/32 | Pickard | 242—56.1 |
| 2,785,351 | 3/57 | Allison | 317—260 |
| 2,861,231 | 11/58 | Robinson et al. | 317—260 |
| 2,974,396 | 3/61 | Allison | 29—25.42 |
| 3,040,415 | 6/62 | Rayburn | 29—25.42 |

RICHARD H. EANES, JR., *Primary Examiner.*

JOHN T. BURNS, *Examiner.*